(12) United States Patent
Tabuchi et al.

(10) Patent No.: US 6,193,947 B1
(45) Date of Patent: *Feb. 27, 2001

(54) PROCESS FOR PREPARING LAYERED ROCK-SALT TYPE LITHIUM MANGANESE OXIDE BY MIXED ALKALINE HYDROTHERMAL METHOD

(75) Inventors: Mitsuharu Tabuchi; Kazuaki Ado; Hironori Kobayashi; Hiroyuki Kageyama, all of Ikeda (JP)

(73) Assignee: Agency of Industrial Science and Technology, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,191

(22) Filed: Jun. 29, 1998

(30) Foreign Application Priority Data

Jul. 3, 1997 (JP) .................................................. 9-195056

(51) Int. Cl.$^7$ .............................. C01G 45/12; C01D 15/00
(52) U.S. Cl. ............................................................ 423/599
(58) Field of Search ......................... 423/599, 49, 179.5; 429/224

(56) References Cited

U.S. PATENT DOCUMENTS 5,648,057 * 7/1997 Ueda et al. ........................... 423/599
5,683,835 * 11/1997 Bruce ................................... 423/599

FOREIGN PATENT DOCUMENTS 4-253161 * 9/1992 (JP) .

OTHER PUBLICATIONS

Tabuchi, et al., "Synthesis of LiMnO2 with . . . Hydrothermal Reaction," J. Electrochemical Soc., 145(4), L49–52, Apr. 1998.*

* cited by examiner

Primary Examiner—Steven Bos
(74) Attorney, Agent, or Firm—Arent Fox Kintner Plotkin Kahn

(57) ABSTRACT

Hydrothermal treatment of at least one manganese source material, for example, an oxide of manganese, such as $Mn_2O_3$, $MnO$, or $MnO_2$, in an aqueous solution containing at least one water-soluble lithium salt, such as lithium hydroxide, lithium chloride, lithium nitrate, lithium fluoride, or lithium bromide, and an alkaline metal hydroxide, such as potassium hydroxide, at 130 to 300° C. can realize the preparation of a lithium manganese oxide ($LiMnO_2$) having a layered rock-salt structure in a single stage.

4 Claims, 1 Drawing Sheet

PROCESS FOR PREPARING LAYERED ROCK-SALT TYPE LITHIUM MANGANESE OXIDE BY MIXED ALKALINE HYDROTHERMAL METHOD

BACKGROUND OF THE INVENTION

The present invention relates to a process for preparing a lithium manganese oxide ($LiMnO_2$) powder having an $\alpha$-$NaMnO_2$ type layered rock-salt structure. This lithium manganese oxide powder is useful as cathode materials for lithium rechargeable batteries.

At the present time, lithium rechargeable batteries are used as a power source for portable electronic/electric appliances. Lithium cobalt and nickel oxides ($LiCoO_2$, $LiNiO_2$, and solid solutions thereof) having an $\alpha$-$NaFeO_2$ type layered rock-salt structure have been studied and developed and put to practical use as cathode materials for the lithium rechargeable batteries. Although these cathode materials advantageously have high operating voltage and high capacity, they contain a rare metal, cobalt (Co) or nickel (Ni), and hence are expensive. This is an obstacle to the expansion of market of lithium rechargeable batteries using the cathode material (the cost of the cathode material occupies about one-third of the material cost of the battery).

Further, lithium manganese oxides, such as $LiMn_2O_4$ and $LiMnO_2$, have attracted attention as low-cost cathode materials of an advanced 4-volt class, and research and development thereof are being conduced. In particular, for $LiMnO_2$, manganese has a valency of 3, whereas for $LiMn_2O_4$, manganese has a valency of 3.5. Therefore, for $LiMnO_2$, a higher discharge and charge capacity than that for $LiMn_2O_4$ can be expected, and, hence, $LiMnO_2$ is a most promising, advanced low-cost cathode material. $LiMnO_2$ compounds known in the art are classified into two crystal phases (orthorhombic phase ($\beta$-$NaMnO_2$ type structure; hereinafter referred to as "orthorhombic $LiMnO_2$," and a monoclinic phase having a layered rock-salt structure ($\alpha$-$NaMnO_2$ type structure; hereinafter referred to as "layered rock-salt $LiMnO_2$").

However, conventional methods, that is, a method wherein a mixture of various lithium and trivalent manganese compounds is subjected to a solid phase reaction at 500 to 900° C. (R. J. Gummow and M. M. Thackeray, j, Electrochem. Soc., 141[5] (1994)1178) and a method wherein the above mixture is hydrothermally treated at 150 to 300° C. (M. Tabuchi, K. Ado, C. Masquelier, H. Sakaebe, H. Kobayashi, R. Kanno and 0. Nakamura, Solid State Inoics, 89, (1996)53), can provide only orthorhombic $LiMnO_2$. In this phase, lithium can be electrochemically eliminated/inserted. Since, however, repetition of discharge and charge causes gradual transition to another crystal phase (spinel phase), the stability of discharge and charge curves with respect to discharge and charge cycles is disadvantageously low.

Therefore, the establishment of a process for preparing layered rock-salt type $LiMnO_2$ having the same crystal structure as $LiNiO_2$ or $LiCoO_2$ has been urgently demanded in the art. At the present time, this compound is synthesized by ion-exchanging $\alpha$-$NaMnO_2$, synthesized by a conventional solid phase reaction in an nonaqueous solvent containing lithium ions at a temperature of 300° C. or below (A. R. Armstrong and P. G. Bruce. NATURE. 381, [6]. (1996) 499; F. Capitain, Pravereau and C.Delmas, Solid State Ionics, 89, (1996)53: these two documents being hereinafter referred to as "references"). In an industrial process, these methods require two stages, i.e., preparation of $\alpha$-$NaMnO_2$ and ion exchange thereof, unfavorably making it difficult to mass-produce layered rock-salt $LiMnO_2$. Therefore, the development of an alternative novel practical process has been desired in the art.

SUMMARY OF THE INVENTION:

Accordingly, an object of the present invention is to provide a preparation process suitable for mass-production of layered rock-salt $LiMnO_2$ as a low-cost cathode material for a lithium rechargeable battery.

The present inventors have made extensive and intensive studies in view of the problems of the prior art and as a result have succeeded in establishing a technique wherein a layered rock-salt $LiMnO_2$, which is one of lithium-containing transition metal oxides, i.e., promising cathode materials for next generation lithium rechargeable batteries, can be prepared without passing through $\alpha$-$NaMnO_2$ by applying a hydrothermal method using a particular raw material.

Thus, a process for preparing a lithium manganese oxide ($LiMnO_2$) having a layered rock-salt structure according to the present invention is characterized in that at least one manganese source material is hydrothermally treated in an aqueous solution containing water-soluble lithium salt and alkaline metal hydroxide at 130 to 300° C.

Manganese source materials usable in the present invention include, for example, manganese oxides, such as manganese(III) oxide ($Mn_2O_3$), manganese(II) oxide (MnO), and manganese(IV) oxide ($MnO_2$). Among them, $Mn_2O_3$ and other trivalent compounds are preferred as the manganese source material. The above manganese source materials may be used alone or in combination of two or more.

Water-soluble lithium salts usable in the present invention include, for example, lithium hydroxide, lithium chloride, lithium nitrate, lithium fluoride, and lithium bromide. These water-soluble lithium salts may be used alone or in combination of two or more. Further, they may be in the form of an anhydride or a hydrate. Alkaline metal hydroxides usable in the present invention include potassium hydroxide and sodium hydroxide.

The concentrations of respective components in the aqueous mixed alkali solution are as follows. Specifically, the above water-soluble lithium salt and the alkaline metal hydroxide are dissolved in distilled water to prepare an aqueous mixed alkali solution. In this case, the concentration of the water-soluble lithium salt in the aqueous solution is generally about 0.02 to 10 mol/kg·$H_2O$, preferably about 0.05 to 5 mol/kg·$H_2O$, in terms of anhydride based on the total amount of water used, and the concentration of the alkaline metal hydroxide is generally about 3 to 40 mol/kg·$H_2O$, preferably about 8 to 20 mol/kg·$H_2O$, in terms of anhydride based on the total amount of water used.

The proportion of the manganese source material based on the aqueous mixed alkali solution is generally about 0.1 to 10 g, preferably about 0.5 to 3 g, based on 100 cc of the aqueous solution. The resultant mixture is then hydrothermally treated under pressure while heating under reaction conditions of a temperature of generally about 130 to 300° C., preferably about 200 to 250° C., a reaction time of generally about 0.5 hr to 14 days, preferably about 1 to 48 hr.

Regarding a hydrothermal treatment oven used (e.g., an autoclave), when the amount of the solution to be hydrothermally treated is small, the solution is placed in an alkali-resistant container, and this container is then placed in an autoclave, followed by hydrothermal treatment in a stationary state. In the case of mass-production, preferably, the reaction is allowed to proceed while stirring in a pressure-resistant reactor subjected to treatment for rendering the reactor alkali-resistant (e.g., an autoclave).

After the completion of the reaction, in order to remove the material remaining unreacted, the reaction product is washed with a solvent, such as methanol, water, or acetone, and filtered, followed by drying to prepare desired layered rock-salt $LiMnO_2$.

According to the present invention, the layered rock-salt $LiMnO_2$, of which the production on a commercial scale at a low cost has been difficult, can be mass-produced in a single stage, further promoting the development of a lithium rechargeable battery using $LiMnO_2$ as a cathode material.

DETAILED DESCRIPTION OF THE PREFERRED EMBODIMENTS

Figure 1:
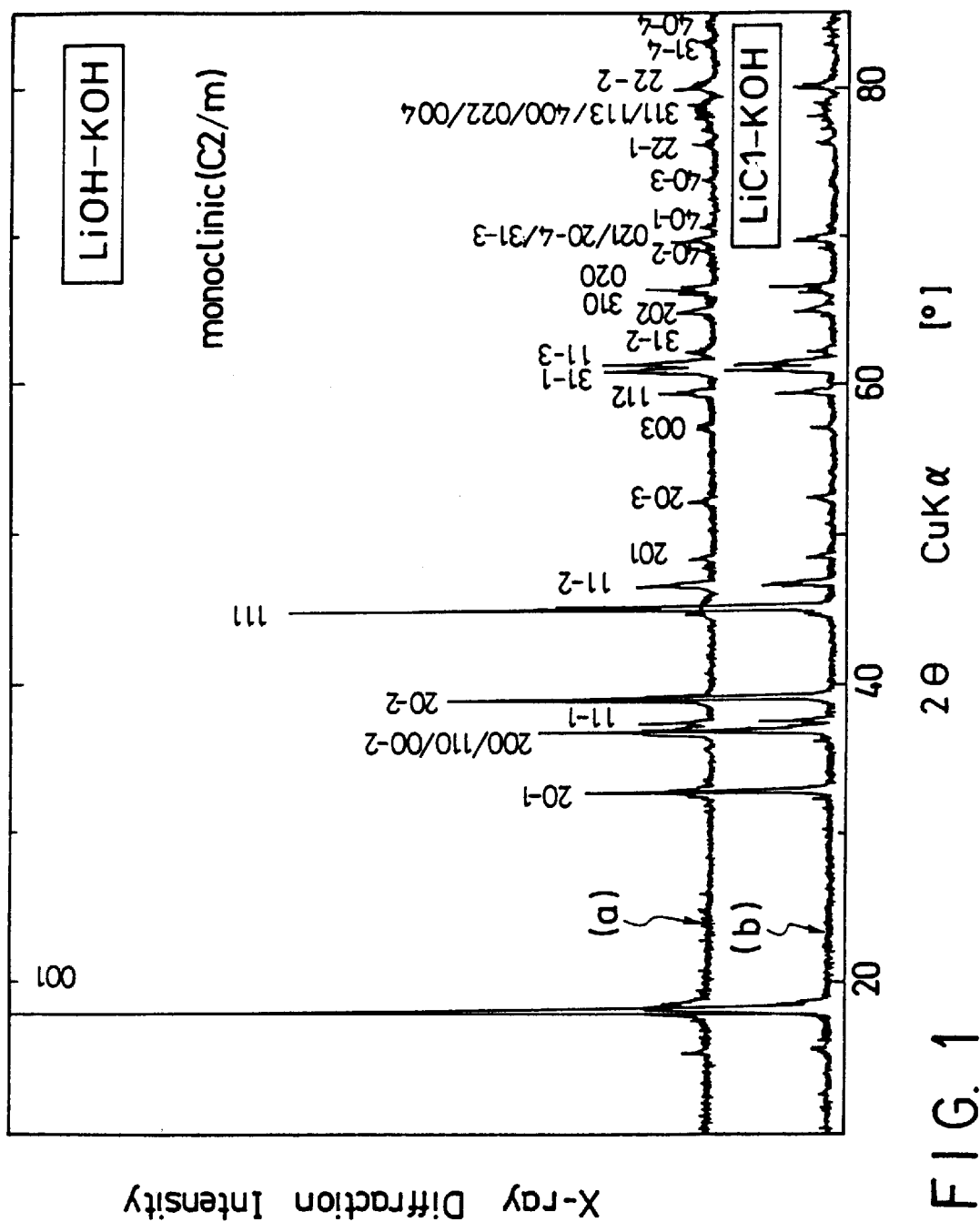
FIG. 1 is a graph showing the results of X-ray diffraction of $LiMnO_2$ prepared in Examples 1 and 2.

The following Examples illustrate the features of the present invention more specifically. The crystal phase of samples prepared in the Examples were evaluated by X-ray diffraction analysis.

Example 1

1.1 g of lithium hydroxide monohydrate and 70 g of potassium hydroxide were placed in a polytetra-fluoroethylene beaker. 100 cc of distilled water was added thereto, and the mixture was thoroughly stirred for complete dissolution. Thereafter, 1 g of manganese (III) oxide ($Mn_2O_3$) was added to the solution, and the mixture was thoroughly stirred.

The beaker was then allowed to stand still in an autoclave, and hydrothermal treatment was then carried out at 220° C. for 8 hr. After the completion of the hydrothermal treatment, when the temperature of the contents of the beaker fell to about 60° C., the beaker was taken out of the autoclave, the resultant powder was washed with methanol to remove excess lithium hydroxide and potassium hydroxide, filtered, and dried to prepare a powdery product.

An X-ray diffraction pattern of the final product is shown in FIG. 1 (a). All the diffraction peaks except for a peak around $2\theta=15°$ (attributable to orthorhombic $LiMnO_2$) could be indexed (to numerical values attached to respective peaks in FIG. 1) by unit cells of monoclinic, layered rock-salt $LiMnO_2$ reported in the above "references" (space group C2/m, a=5.4387Å, b=2.80857Å, c=5.3878Å, β=116.006°).

Example 2

1.0 g of anhydrous lithium chloride and 70 g of potassium hydroxide were placed in a polytetra-fluoroethylene beaker. 100 cc of distilled water was added thereto, and the mixture was thoroughly stirred for complete dissolution. Thereafter, 1 g of manganese(III) oxide ($Mn_2O_3$) was added to the solution, and the mixture was thoroughly stirred.

The beaker was then allowed to stand still in an autoclave, and hydrothermal treatment was then carried out at 220° C. for 8 hr. After the completion of the hydrothermal treatment, when the temperature of the contents of the beaker fell to about 60° C., the beaker was taken out of the autoclave, the resultant powder was washed with methanol to remove excess lithium hydroxide and potassium hydroxide, filtered, and dried to prepare a powdery product.

An X-ray diffraction pattern of the final product is shown in FIG. 1 (b). As with the diffraction peaks in Example 1, all the diffraction peaks except for a peak around $2\theta=15°$ (attributable to orthorhombic $LiMnO_2$) could be indexed by unit cells of monoclinic, layered rock-salt $LiMnO_2$ reported in the above "references."

What is claimed is:

1. A process for preparing a lithium manganese oxide ($LiMnO_2$) having a layered rock-salt structure, comprising hydrothermally treating at least one manganese source material in an aqueous solution containing an alkaline metal hydroxide and a water-soluble lithium salt under pressure at a temperature of 130 to 300° C.

2. The process according to claim 1 wherein the manganese source material is an oxide of manganese.

3. The process according to claim 1 or 2, wherein the water-soluble lithium salt is at least one member selected from the group consisting of lithium hydroxide, lithium chloride, lithium nitrate, lithium fluoride, and lithium bromide.

4. The process according to claim 1 or 2, wherein the alkaline metal hydroxide is potassium hydroxide.

* * * * *